United States Patent [19]

Wiley

[11] 3,961,483
[45] June 8, 1976

[54] COMPOSITE CYCLE ENGINE

[75] Inventor: Edward Robin Wiley, Mercer Island, Wash.

[73] Assignee: The Boeing Company, Seattle, Wash.

[22] Filed: July 3, 1975

[21] Appl. No.: 593,097

[52] U.S. Cl. .................................. 60/616; 60/517; 60/655; 418/219
[51] Int. Cl.² ........................................ F01K 23/10
[58] Field of Search ............... 60/655, 616, 39.18 R, 60/39.18 C, 39.19, 517, 617, 618

[56] References Cited
UNITED STATES PATENTS

| | | | |
|---|---|---|---|
| 3,180,078 | 4/1965 | Liston | 60/616 |
| 3,762,844 | 10/1973 | Isaksen | 418/218 |
| 3,838,954 | 10/1974 | Rapone | 418/219 |

FOREIGN PATENTS OR APPLICATIONS

| | | | |
|---|---|---|---|
| 388,781 | 6/1965 | Switzerland | 418/218 |

Primary Examiner—Allen M. Ostrager
Attorney, Agent, or Firm—Donald A. Streck

[57] ABSTRACT

The present invention discloses an engine with 25 to 70% better overall efficiency with exhaust emissions within present EPA 1975 standards. The vane type rotary engine uses exhaust from a multichamber Otto cycle engine to power a Stirling cycle engine on the same shaft. Fuel burned in the high surface to volume ratio chambers in the Otto cycle produce very little $NO_2 + N_0$ gas while producing excessive amounts of unburned hydrocarbons. Air injection into the extremely hot exhaust gases characteristic of the vane type engine is used in a hot wall continuous burning afterburner to remove unburned hydrocarbons and boost the temperature prior to the Stirling cycle hot side heat exchanger.

12 Claims, 20 Drawing Figures

DIRECTION OF ROTATION

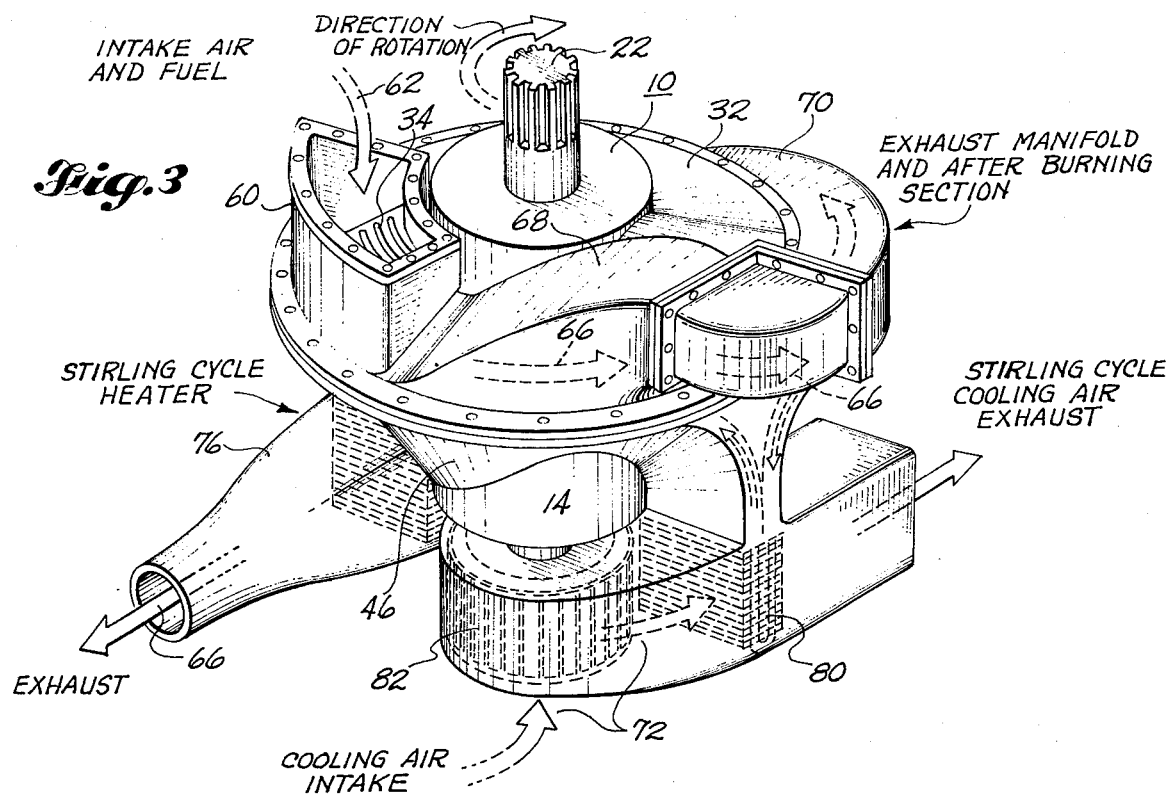
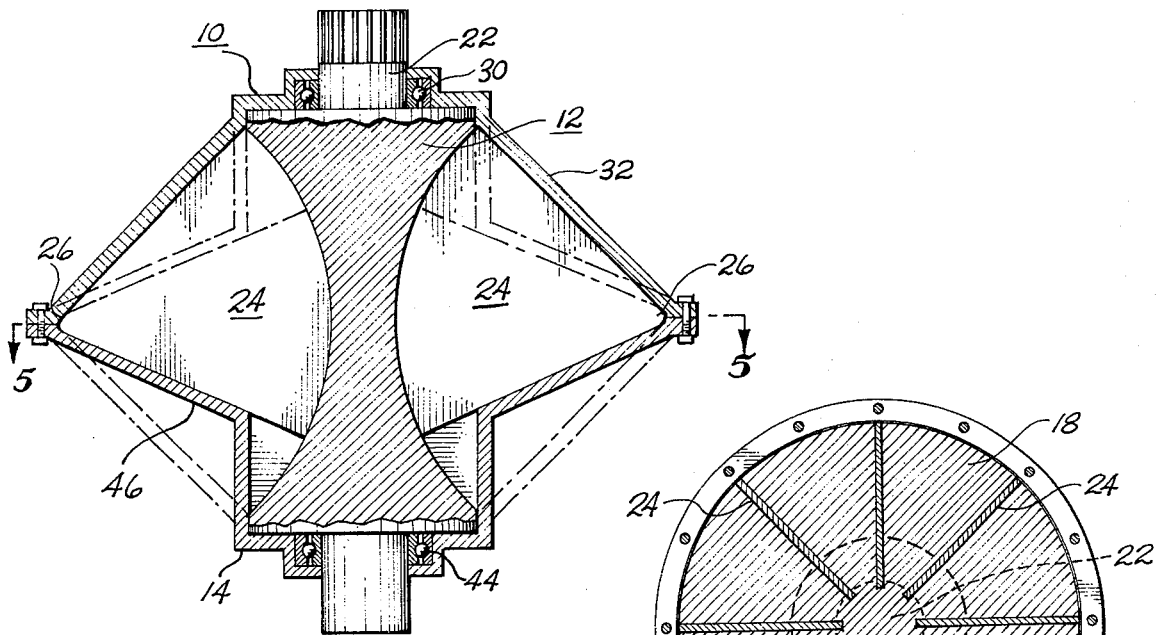

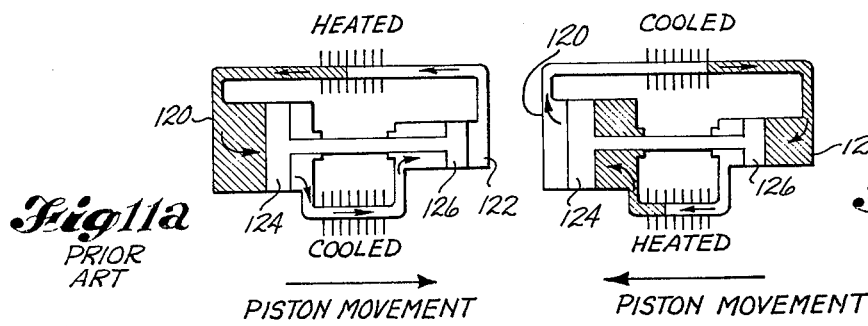
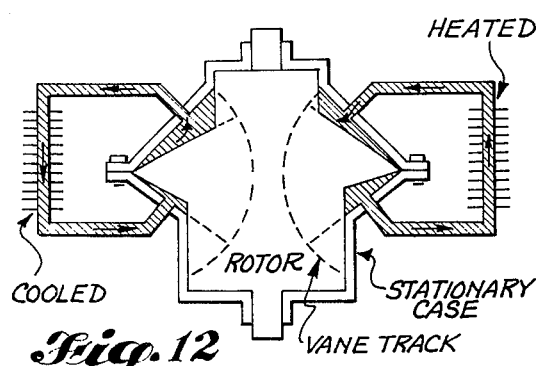
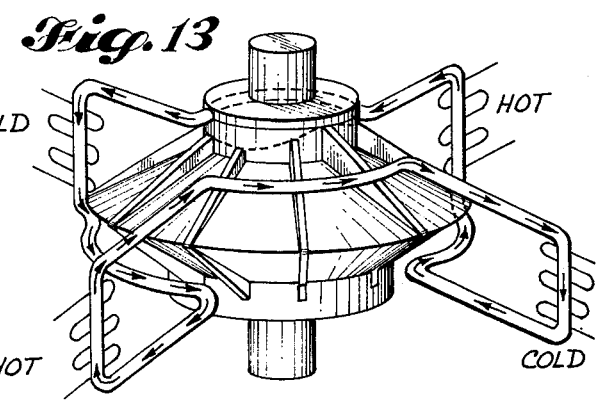
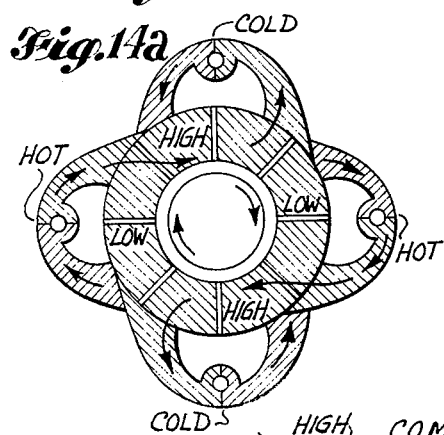
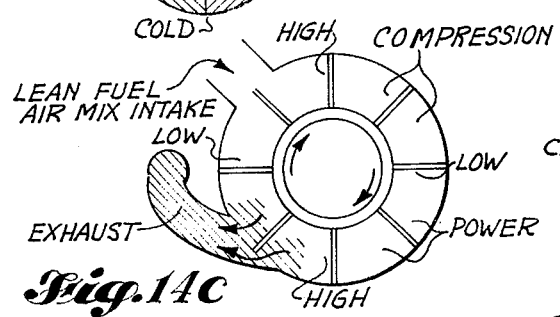
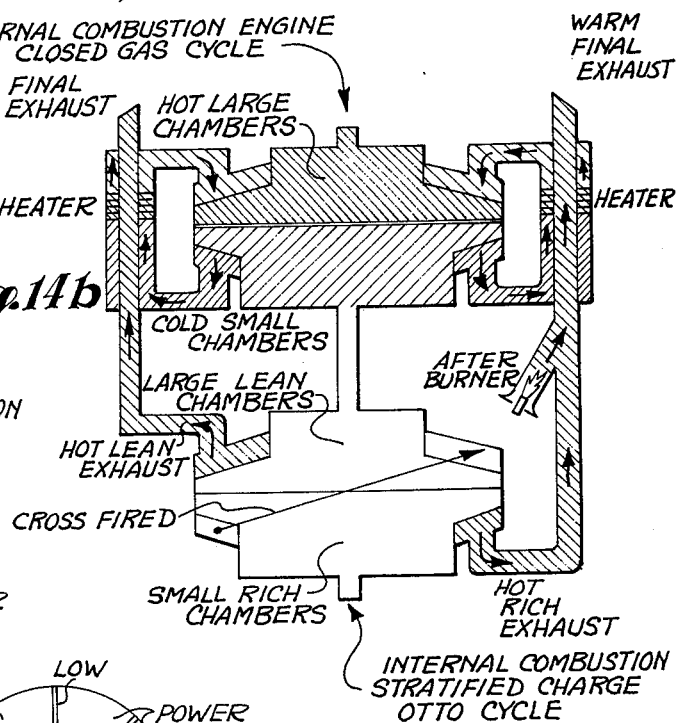
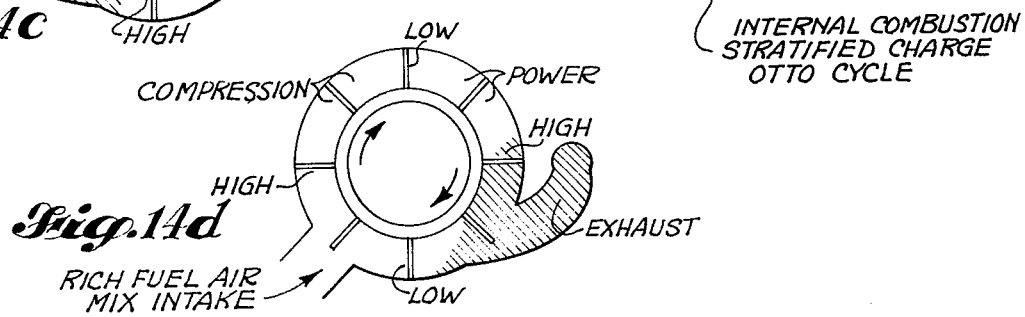

COMPOSITE CYCLE ENGINE

BACKGROUND OF THE INVENTION

1. Field of the Invention

Relates to rotary type engines and particularly to vane type rotary engines. Relates more particularly to vane type rotary engines of composite structure employing an Otto cycle and Stirling cycle on one shaft.

2. Description of the Prior Art

In any internal engine there presently exists the problem of disposing of undesirable exhaust emissions. In a single cycle Otto engine burning gasoline, as is most common today, there does not presently exist a design which reduces both the $NO_2 + N_0$ and unburned hydrocarbons. General practice is to design the engine for a particular purpose and then remove resultant emissions through the addition of power consuming add-on devices such as thermactors, afterburners, and catalytic chambers.

The combining of the Otto cycle with the Stirling cycle is itself not new as shown by the U.S. Pat. No. 3,180,078 to Liston (copy enclosed herewith). As Liston observed, however, at lines 3 through 8 of page 1, "In an internal-combustion engine operating under varying speeds and loads, wide variations occur in the temperature of the exhaust gases; and when the exhaust gases are used to heat the hot space of a Stirling engine, the output of the latter engine will vary with the temperature of the exhaust gases". This is particularly true in a piston engine as employed by Liston or even the present Wankel type rotary engines due to the pulsating exhaust. Liston recognized the potential of the unburned hydrocarbons for producing additional heat but was required to go to a mechanized flip-flop system of selectively burning or non-burning of the unburned hydrocarbons as sensed by additional instrumentation.

In addition to the exhaust of the piston engine being pulsed, thus alternating high temperature inputs with cooling intervals, the Liston engine Stirling element overlaps cycle functions and reverses gas flows. This overlap is inherent in the piston design indicated and is described at lines 57–69 of page 2 of Liston's patent.

The basic device employed in the present invention being a plurality of vanes moving between sinusoidal covers is also not a new concept in itself as shown by the U.S. Pat. No. 3,762,844 to Isaksen and the Swiss Pat. No. 388,781 to Keller (copies enclosed herewith). The embodiment as shown is, however, novel in many of its features particularly as adapted to the specific application as will hereinafter be described.

In Isaksen's engine and Keller's embodiment of FIG. 4, a generally triangular vane is pivoted on a pin at the hub near the rotating shaft. This approach creates two problems. First, the centrifugal forces in the rotating vanes are borne by the pivot pins and the thin webs of the vanes adjacent to the pivot pin holes in the vanes. This, of course, creates a fatigue and possible failure point. Moreover, the pivot pin must be removed to remove a vane for servicing. Second, and most important, as the pivot pins and vanes wear, the vanes tend to move away from the confining surfaces thus creating a loss of the compression seal. A similar wear problem is created in the main embodiments of Keller as shown in FIGS. 1 through 3.

Thus, it is the prime objective of the present invention to provide a composite cycle engine which does not reverse flow direction in the Stirling cycle and, more importantly, does not overlap cycle functions. Said engine's Stirling cycle to compress the working gas to minimum volume before it is heated and to expand the working gas to maximum volume before cooling.

It is another object of the present invention to provide a composite cycle engine wherein the Otto cycle portion not only provides higher energy exhaust, but wherein said engine is able to convert more of that available heat energy to mechanical work in its Stirling cycle.

It is yet a further object of the present invention to provide a composite cycle engine of compact design and light weight.

It is still another object of the present invention to provide a composite cycle engine of the moving vane type wherein the vanes do not lose compression upon wear and being of a design maximizing ease of maintenance and repair while minimizing failure rate.

DESCRIPTION OF THE DRAWINGS

FIG. 3 is a conceptual view of the present invention as assembled.

FIG. 4 is a cutaway elevation of the assembled major moving parts of the present invention.

FIG. 5 is a cutaway top view of the assembled major moving parts of the present invention.

FIGS. 11a and 11b are prior art representations of the working of a piston closed hot gas cycle.

FIG. 12 is a representation of the vane mechanism of the present invention operating in the same manner as the pistons of FIGS. 11a and 11b.

FIG. 13 is a representation of the gas flow in a vane type closed hot gas cycle engine.

FIGS. 14a, 14b, 14c and 14d depict the interconnection and operation of a closed hot gas cycle and stratified charge engine on one shaft.

DESCRIPTION AND OPERATION OF THE PREFERRED EMBODIMENT

The construction and operation of the present invention are best understood referenced to the figures in which like numbering indicates like parts in the various views and diagrams.

Figure 1:
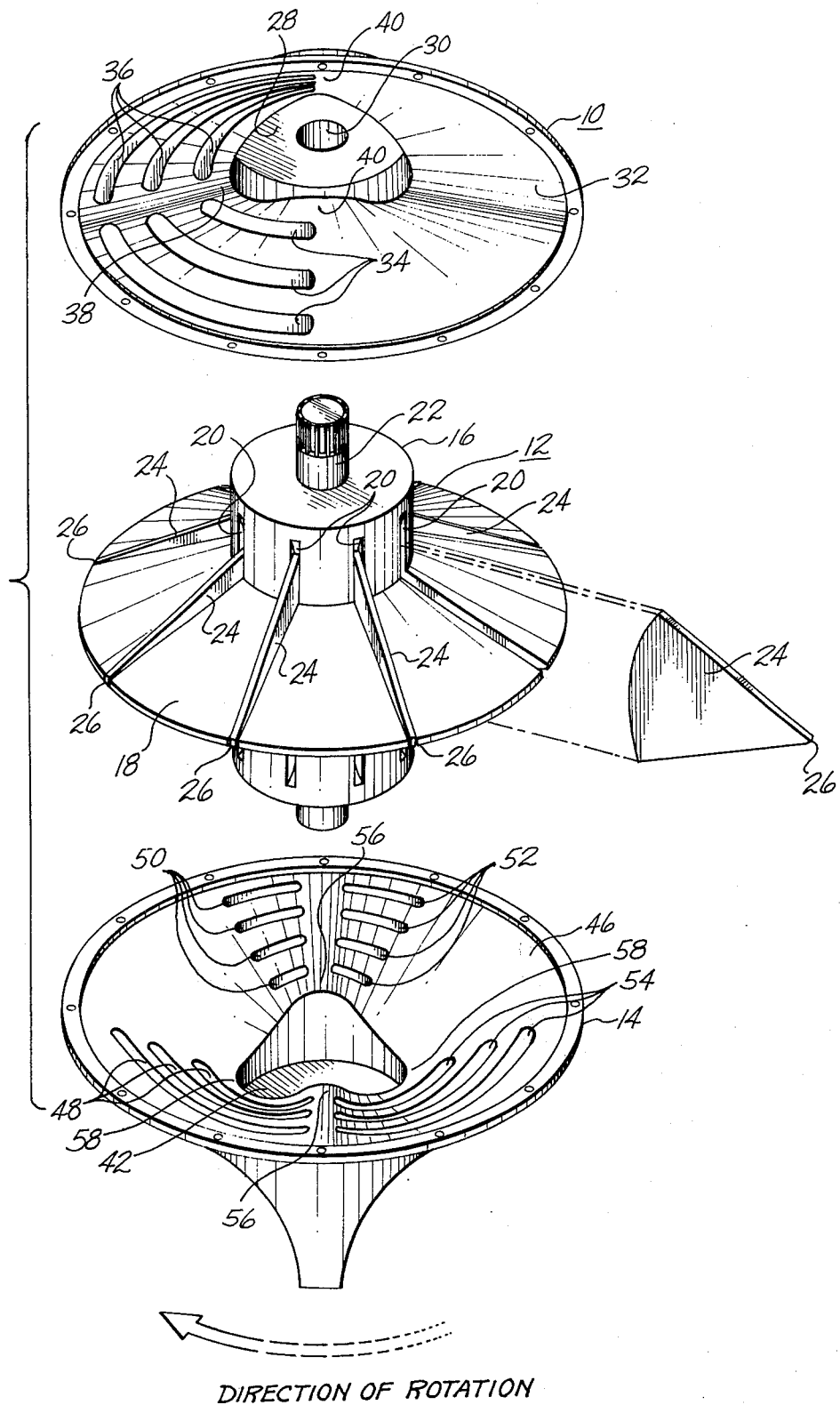
FIG. 1 is an exploded view of the major moving parts of the present invention.

Referring first to FIG. 1, the three major components of the engine proper are shown comprising a top housing assembly 10, a rotor assembly 12, and a bottom housing assembly 14. The rotor assembly 12 is the only moving part of the engine and comprises a rotor having a hub 16 and a plate 18 containing equally angularly spaced vane slots 20, a shaft 22, and movable vanes 24. Each vane 24 is free to move in its vane slot 20 by pivoting about a pivot point 26 at the periphery of the plate 18 of the rotor. Each vane 24 pivots from one extreme position wherein its top edge is flush with the top surface of the plate 18 of the rotor to a second extreme position wherein its bottom edge is flush with the bottom surface of the plate 18 of the rotor. In the novel arrangement of the movable vanes 24 as employed herein, it is to be noted that the use of a pivot pin as in the prior art is eliminated. Thus the movable vanes 24 can be easily removed for servicing. Likewise, as wear occurs at pivot points 26 the centrifugal forces on the movable vanes 24 will force them against the inner surfaces of the engine helping them seal and adapt for wear rather than moving away from the surfaces.

The top housing assembly 10 comprises a central top hub cover 28 containing a top bearing 30 to support the top end of shaft 22 and a shaped top vane cover 32 containing Otto intake ports 34 and Otto exhaust ports 36. The top vane cover 32 is sinusoidal in shape, having two complete cycles in its 360°. There are two top high points 38, one between the Otto intake ports 34 and the Otto exhaust ports 36 and one 180° away. There are two top low points 40 located 90° from the top high points 38. A top high point 38 is a point where the top vane cover 32 comes in closest proximity to the plate 18 of the rotor thus forcing the top edge of a vane 24 located thereunder to be substantially flush with the top surface of the plate 18. A top low point 40 is a point where the top vane cover 32 is in farthest proximity to the plate 18 of the rotor such that when a vane 24 is in contact with the top vane cover 32 at a top low point 40, the bottom edge of that vane 24 will be substantially flush with the bottom surface of the plate 18.

The bottom housing assembly 14 comprises a central bottom hub cover 42 containing a bottom bearing 44 to support the bottom end of shaft 22 and a shaped bottom vane cover 46 containing Stirling cold in ports 48, Stirling cold out ports 50, Stirling hot in ports 52, and Stirling hot out ports 54. The bottom vane cover 46 is sinusoidal in shape in the same manner as the top vane cover 32 with two bottom high points 56 directly opposite the two top low points 40 of the top vane cover 32 and two bottom low points 58 directly opposite the two top high points 38 of the top vane cover 32.

Figure 2:
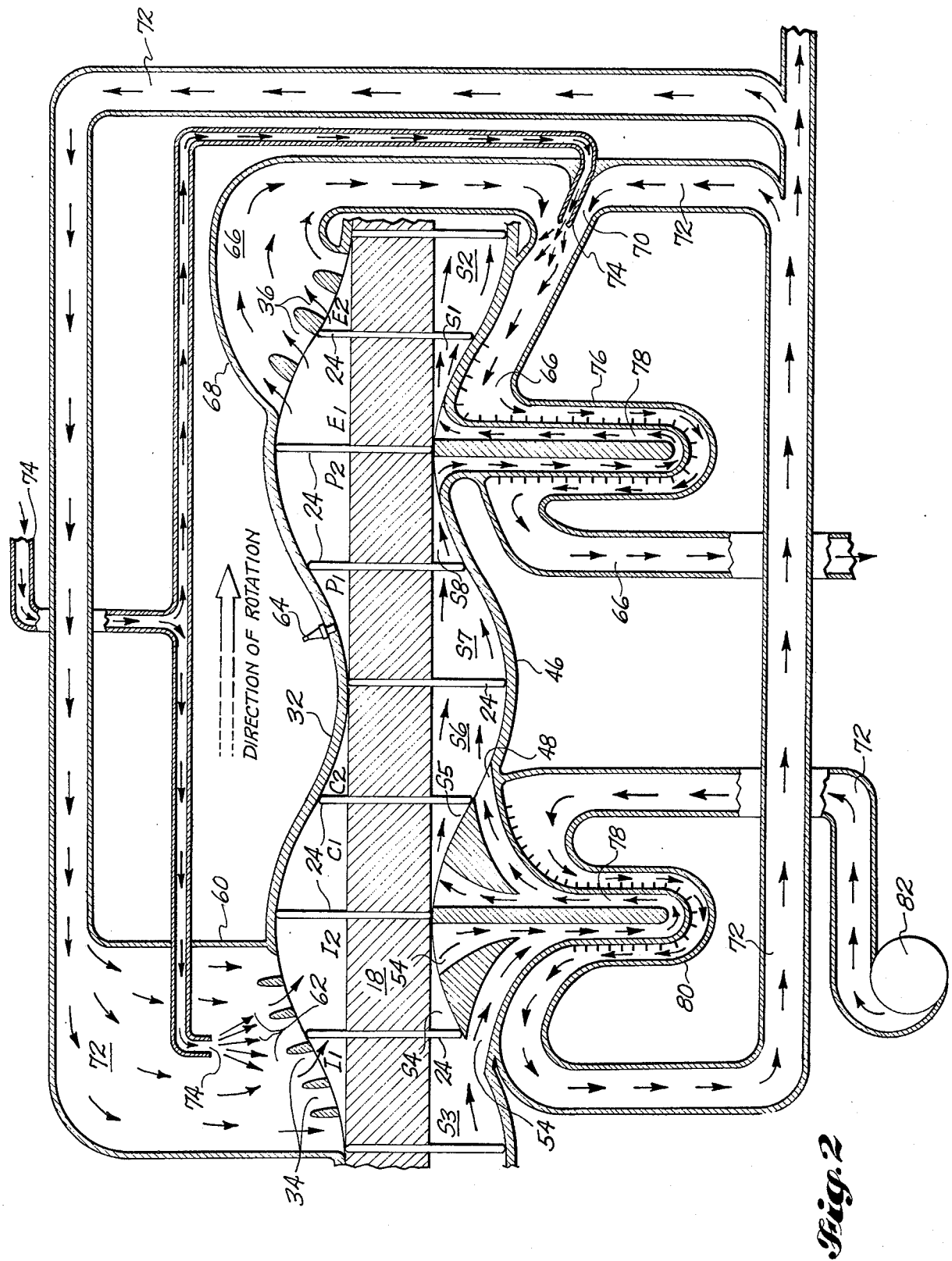
FIG. 2 is a diagrammatic representation in two dimensions of the operation of the present invention in its 360° of rotation at one instant in time.

Referring next to FIG. 2 through FIG. 5, the operation of the engine is shown diagrammatically in FIG. 2 and the additional equipment necessary for operation is shown in FIG. 2 and FIG. 3. An intake manifold 60 is attached over the Otto intake ports 34. Fuel/Air mixture 62 from a standard source such as a carburetor or fuel injection system (not shown) enters the intake manifold 60 adjacent to the Otto intake ports 34. As the plate 18 of the rotor revolves, the vanes 24 being contained in slots 20 and between the top vane cover 32 and the bottom vane cover 46 move up and down pivotally about their pivot points 26 between their extreme up and extreme down positions as shown in FIG. 2. As plate 18 revolves, the spaces between the plate 18, the top vane cover 32 and between adjacent vanes 24 expand and contract in the same manner as the space above the pistons in a piston 4-cycle engine. Thus, in spaces $I_1$ and $I_2$, the volume of the space is expanding thus causing fuel/air mixture 62 to be drawn through Otto intake ports 34 into spaces $I_1$ and $I_2$. In spaces $C_1$ and $C_2$, the trapped fuel/air mixture 62 is compressed. In spaces $P_1$ and $P_2$, the compressed fuel/air mixture 62 is ignited by a glow plug 64 causing it to burn and expand thus imparting a rotational force against vanes 24 and thereby against plate 18. In spaces $E_1$ and $E_2$, the hot exhaust gases 66 are forced out Otto exhaust port 36 into exhaust manifold 68 containing after burning section 70. In the afterburning section 70 of exhaust manifold 68 the hot exhaust gases 66 are further burned to eliminate unburned hydrocarbons contained therein and to further raise the temperature. This further burning of the hot exhaust gases 66 can be accomplished either by the addition of ambient air 72 alone or by the addition of both ambient air 72 and injected fuel 74 as shown in FIG. 2. The amount of injected fuel 74 necessary, if any, will depend upon the richness of fuel/air misture 62. The richer fuel/air mixture 62 is, the more unburned hydrocarbons will be contained in exhaust gases 66 and, therefore, the less injected fuel 74 will be necessary to be added in the afterburning section 70 of exhaust manifold 68. The exhaust gases 66 then pass through first heat exchanger 76 where heat is extracted for use by the Stirling cycle portion of the engine as will be hereinafter described. The exhaust gases 66 then continue to a standard exhaust system (not shown) where they are vented to the atmosphere.

In addition to the power forces imparted to vanes 24 in the Otto cycle as described above, additional power forces are imparted to vanes 24 in the Stirling cycle as follows. Stirling air 78 enters first heat exchanger 76 where it picks up heat released from exhaust gases 66. As Stirling gas 78 is heated it is moved through first heat exchanger 76 and into space $S_1$ through Stirling hot in ports 52. The heated Stirling gas 78 expands exerting a power force against vane 24. As the rotor assembly 12 revolves, the Stirling gas 78 continues to expand as depicted by space $S_2$. When the space between adjacent vanes 24 has reached its maximum volume, the vane 24 in the direction of rotation passes to a point where Stirling hot out ports 54 are opened as depicted by space $S_3$. As the rotor assembly 12 continues to revolve, the space between vanes 24 diminishes forcing Stirling gas 78 out Stirling hot out ports 54 and into second heat exchanger 80. Ambient air 72 is drawn in by blower 82 and forced thereby through second heat exchanger 80 and thence throughout the engine as a source of ambient air 72 for other uses as hereinbefore described. The cooler ambient air 72 passing through second heat exchanger 80 picks up heat from Stirling gas 78 causing it to cool and contract. The contracting of Stirling gas 78 aids in extracting the Stirling gas 78 from spaces $S_3$ and $S_4$. Cooled compact Stirling gas 78 moves out of second heat exchanger 80 and into expanding spaces $S_5$ and $S_6$ through Stirling cold in ports 48. As rotor assembly 12 continues to revolve the cold Stirling gas 78 is compressed as depicted by spaces $S_7$ and $S_8$ until it reaches a point where Stirling cold out ports 50 are opened by vane 24 whereupon Stirling gas 78 can move into first heat exchanger 76 to begin the cycle anew.

Figure 6:
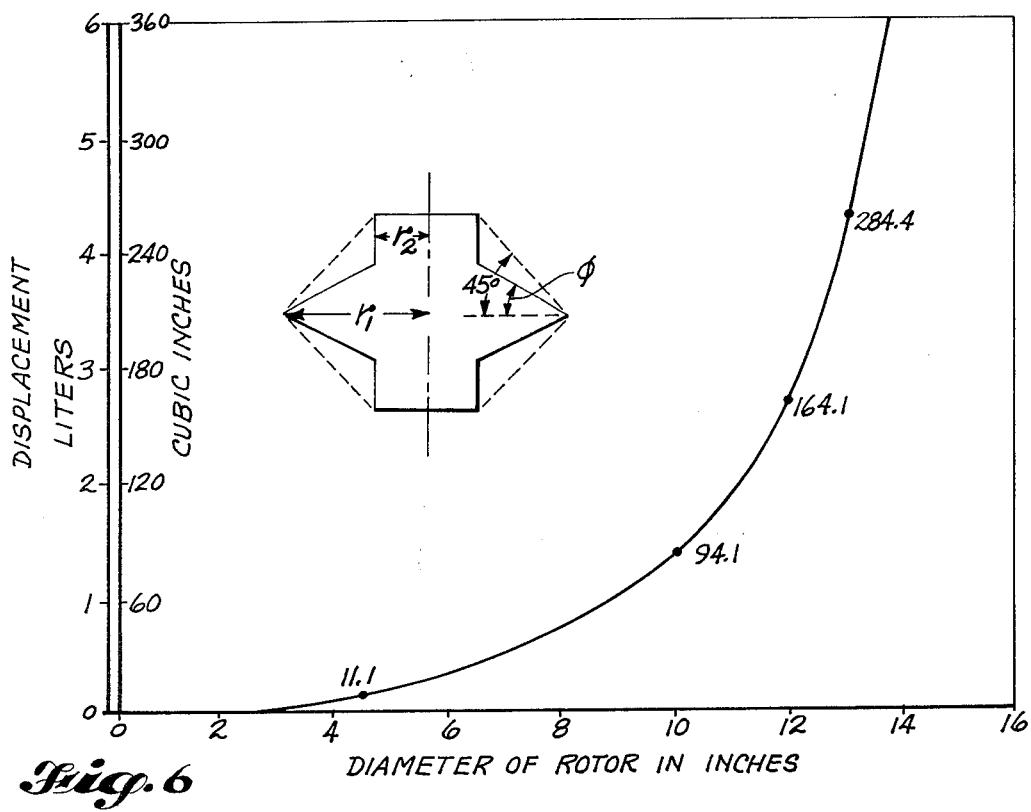
FIG. 6 is a graph showing the displacement of the engine which is the subject of the present invention as a function of the rotor diameter.

Referring now to FIG. 6, the displacement of the preferred embodiment as a function of rotor diameter is graphed. The displacement is shown as described by:

$$\text{DISPLACEMENT} = 2(1-\tan\phi)[\pi/3(r_1^3 - r_2^3) - r_2^2(r_1-r_2) - \frac{1}{2}(r_1-r_2)^2]$$

Where: $r_1/r_2 = 2.5$ and $\phi = 22.50°$

Figure 7:
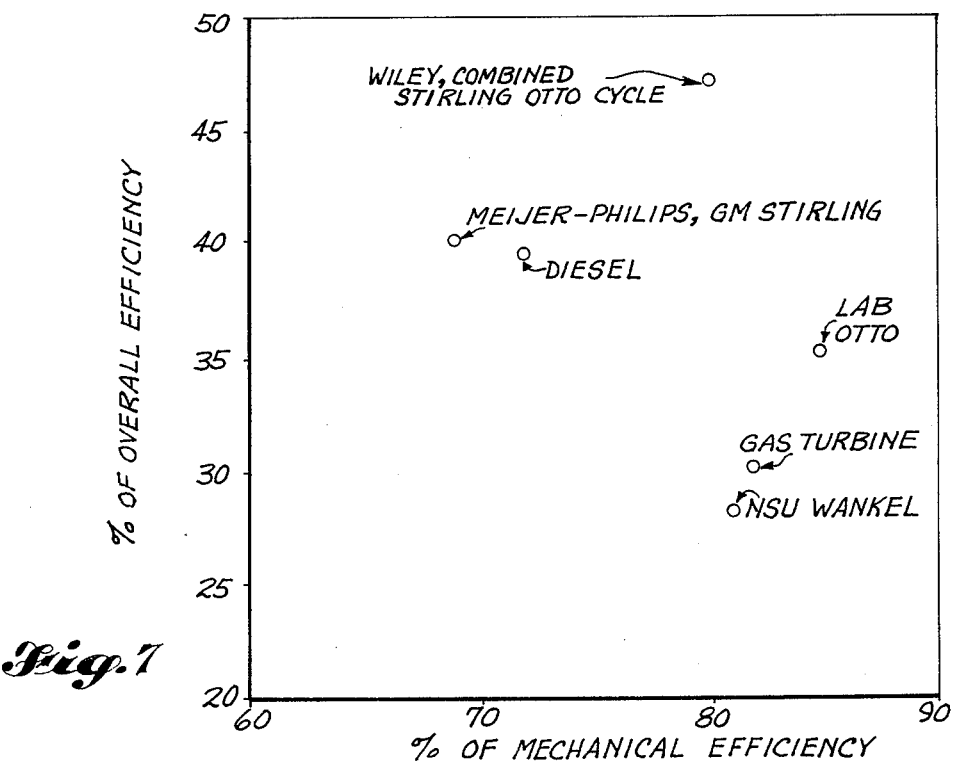
FIG. 7 is a graph showing the efficiency of various types of engine.

As a standard of comparison, we can see that a 10.5 inch rotor produces a 100 cubic inch displacement engine. This engine would compare to a 200 cubic inch piston engine. Assuming the same RPM, compression ratio and fuel type, the output horsepower should be approximately equal. The rotary could be contained in a 16 inch cube while the standard piston engine of that size would require a 40 inch by 30 inch by 30 inch box. The rotary would produce 16 power pulses while a V8 would produce four per revolution. Assuming the same materials and design attention to weight reduction, the rotary engine would weigh one fourth the piston engine weight. Referring to FIG. 7, the per-cent of operating efficiency is graphed against per-cent of mechanical efficiency for various types of engines.

ALTERNATE EMBODIMENTS

While the preferred embodiment as hereinbefore described contemplates one rotor/vane combining a Stirling cycle on one side of the rotor with an Otto cycle on the opposite side of the rotor as best depicted in FIG. 2, the present rotor/vane mechanism can be combined and/or modified to further exploit other combined cycles in one engine.

Figures 8A, 8B, 8C, 9, 10:
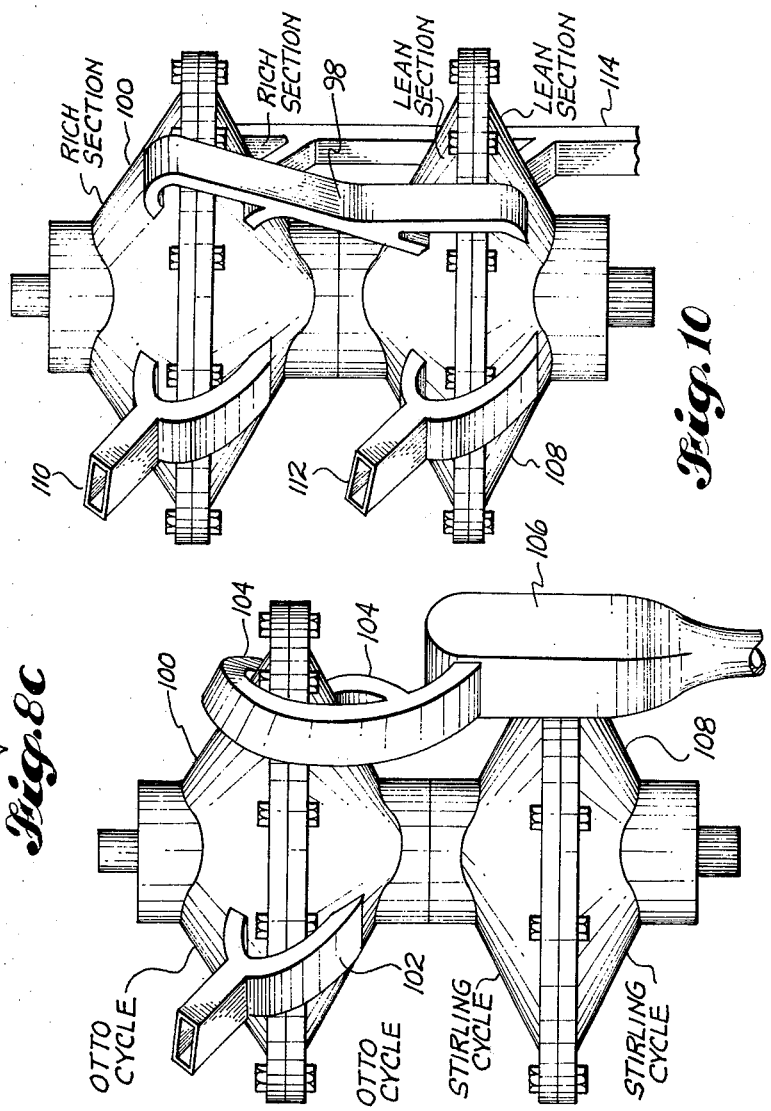
FIGS. 8a, 8b, and 8c are a brief representation of the present basic mechanism in an alternate embodiment as a Stratified Charge engine. Included as FIG. 8c is a diagrammatic representation in two dimensions of 360° of rotation at one instant in time.
FIG. 9 is an assembled side elevation of a combined Stirling cycle/Otto cycle embodied as two rotary assemblies on one shaft.
FIG. 10 is an assembled side elevation of a Stratified Charge engine embodied as two rotary assemblies on one shaft.

Referring first to FIGS. 8a and 8b a basic stratified charge engine is disclosed combining a lean Otto cycle with a rich Otto cycle. The first modification necessary for the Stratified Charge combined cycle engine is a double diameter hub section as shown in FIG. 8a. Small radius hub 90 along with vanes 24 and plate 18 defined large chambers 92. Large radius hub 94 along with vanes 24 and plate 18 define small chambers 96. The second modification necessary is the provision of a flame duct 98 as shown in FIG. 8b to allow the flame front to move from the rich section to the lean section and thereby ignite the lean fuel/air mixture therein. The operation of the Stratified Charge engine is shown diagrammatically in FIG. 8c in the same manner as that used in FIG. 2. As the rotor revolves, the large chambers 92 take in sequence the functions labeled 1L through 8L in FIG. 8c. In a similar manner, the small chambers 96 labeled 1R through 8R go through the functions as indicated of intake, compression, ignition, and exhaust. In the Stratified Charge engine the lean section, being large chambers 92, is charged at the intake sections 1L and 2L with a lean fuel/air mixture from a lean mixture source (not shown). The rich section, being small chambers 96, is charged at the intake sections 1R and 2R with a rich fuel/air mixture from a rich mixture source (not shown). As the rich fuel/air mixture reaches the ignition point 5R, it is ignited in the conventional manner by a spark plug or glow plug. Thereafter while still burning, the rich fuel/air mixture rotates to the opening of the flame duct 98 as shown by position 6R. The flame front then moves through flame duct 98 to ignite and cause the complete burning of the compressed lean fuel/air mixture at position 5L located at the opposite end of the flame duct 98 in the lean section.

As an alternate to combining two cycles on opposite sides of one rotor plate, two basic assemblies can be combined on one shaft and interconnected with one cycle in one unit and the other cycle in the second unit. This is a particularly useful technique where one cycle employs high pressures with attendant sealing problems. Likewise, two cycles on one shaft can provide the advantage of one cycle operation during emergencies or for lower power operation (e.g. trolling with an outboard motor).

The Stirling cycle/Otto cycle combined on one shaft is shown briefly in FIG. 9. Both sides of the upper rotary assembly 100 are operated in the Otto cycle employing common intake manifold 102 as the source of fuel/air mixture. Both sides of the upper rotary assembly 100 exhaust from the Otto cycle into common exhaust manifold 104 which passes through common first heat exchanger 106 providing heat to both sides of lower rotary assembly 108 operating as a Stirling cycle. A common second heat exchanger (not shown) provides cooling for both sides of lower rotary assembly 108. Upper rotary assembly 100 and lower rotary assembly 108 are each sealed units independent of each other insofar as the operation of the cycles are concerned and thus require no special sealing between cycles as with cycles combined in one housing on opposite sides of a common rotor plate.

FIG. 10 briefly shows the common shaft embodiment of the Stratified Charge engine employing the present basic rotary assembly. The upper rotary assembly 100 is operated in the Otto cycle using a rich fuel/air mixture introduced through common rich intake manifold 110. The flame front moves down flame duct 98 to ignite the lean fuel/air mixture contained in lower rotary assembly 108 introduced through lean intake manifold 112. The exhaust from both sides of both assemblies 100 and 108 is removed through dual exhaust manifold 114.

A further embodiment of the present basic rotary mechanism is possible employing closed cycle hot gas cycles. While these engines do not have the advantages of lightweight and compactness offered by the previous embodiments presented, they have the advantage of long life, low pollution content in emission and flexibility in the type of fuel used. As external combustion engines, the working gas is sealed in so that no dust or grit can enter the working parts of the engine. The basic principle is shown in FIG. 11a and FIG. 11b. These engines are configured to have a large volume hot chamber 120 and a small volume cold chamber 122. A large piston 124 in the hot chamber 120 is connected to a small piston 126 in the cold chamber. As the working gas on either side of the pistons 124 and 126 is alternately heated and cooled, the expansion and contraction of the working gas forces the pistons 124 and 126 to move in combination as shown. The piston engine example shown is not possible on a continuous cycle basis without elaborate valving, but illustrates the basic principle, i.e., that even with equal pressure in large and small piston areas, the piston will move away from the hot face of the largest piston. In the rotary application this process is continuous, and compression of cold and expansion of hot areas does vary total working gas volume unlike the piston case. The continuous gas flow pattern of the rotary engine is illustrated by FIG. 12 and FIG. 13.

As with the Stirling cycle engine, the closed cycle hot gas engine can be combined with the Otto cycle or Otto Stratified Charge engine on one shaft as shown by FIGS. 14a, 14b, 14c and 14d.

Having thus disclosed my invention in its preferred and alternate embodiments, I claim:

1. A rotary composite cycle engine comprising:
   a. a first top housing assembly and a first bottom housing assembly, said first housing assemblies each being substantially annular about a central axis passing through a central hub cover in said first housing assemblies having bearing means for supporting a shaft passing through said bearing means along said central axis, said first housing assemblies each having an inner surface contoured as a sinusoid of two periods adjacent to said central hub cover and converging toward focal points at the outer periphery of said annulus, said first housing assemblies being disassemblably joined one to the other along the periphery of said first housing assemblies to form a first sealed sinusoidal enclosure of substantially constant spacing between said first top housing assembly and said first bottom housing assembly at points equidistant from said central axis;

b. a first rotor assembly rotatably disposed within said first sealed sinusoidal enclosure, said first rotor assembly comprising a substantially circular plate having a fixed hub at the center thereof, said hub having a shaft therethrough at the center of and perpendicular to said plate, said shaft being located on said central axes of said first housing assemblies and passing through said bearing means of said first housing assemblies, said circular plate and said hub having a plurality of slots therein disposed angularly equidistant around said rotor;

c. a plurality of first movable vanes disposed within said plurality of slots in said first rotor assembly, said first movable vanes each having a pivot point disposed adjacent one of said focal points of said first sealed sinusoidal enclosure, said first movable vanes each having one edge disposed close adjacent said sinusoidal surface of said first top housing assembly and a second edge disposed close adjacent said sinusoidal surface of said first bottom housing assembly, said first movable vanes defining a plurality of first spaces between said first rotor assembly and said first top housing assembly and an equal number of second spaces between said first rotor assembly and said first bottom housing assembly, said first spaces and said second spaces expanding and contracting sinusoidally as said first rotor assembly rotates;

d. means for inserting a first expandable fluid into said first spaces;

e. means for inserting a second expandable fluid into said second spaces;

f. means for causing said first expandable fluid to expand in one of said first spaces; and, g. means for causing said second expandable fluid to expand in one of said second spaces.

2. A rotary composite cycle engine as claimed in claim 1 wherein:
   a. said first expandable fluid in said first spaces operates in the Otto cycles; and,
   b. said second expandable fluid in said second spaces operates in the Stirling cycle.

3. A rotary composite cycle engine as claimed in claim 1 wherein:
   a. said first expandable fluid in said first spaces is a rich mixture operating in the Otto cycle;
   b. said second expandable fluid in said second spaces is a lean mixture operating in the Otto cycle;
   c. additionally, means are provided to allow one of said first spaces to communicate with one of said second spaces, said first expandable fluid in said first space when burning in the Otto cycle moving through said means for communication to said second space to ignite said second expandable fluid; and
   d. said first spaces are smaller than said second spaces.

4. A rotary composite cycle engine as claimed in claim 1 wherein: said first expandable fluid and said second expandable fluid are operating in a closed hot gas cycle.

5. A rotary composite cycle engine as claimed in claim 1 and additionally comprising:
   a. a second top housing assembly and a second bottom housing assembly, said second housing assemblies each being substantially annular about a central axis passing through a central hub cover in said second housing assemblies having bearing means for supporting said shaft passing through said bearing means along said central axis, said second housing assemblies each having an inner surface contoured as a sinusoid of two periods adjacent to said central hub cover and converging toward focal points at the outer periphery of said annulus, said second housing assemblies being disassemblably joined one to the other along the periphery of said second housing assemblies to form a second sealed sinusoidal enclosure of substantially constant spacing between said second top housing assembly and said second bottom housing assembly at points equidistant from said central axis;
   b. a second rotor assembly rotatably disposed within said second sealed sinusoidal enclosure, said second rotor assembly comprising a substantially circular plate having a fixed hub at the center thereof, said hub having said shaft passing therethrough at the center of and perpendicular to said plate, said shaft being located on said central axes of said second housing assemblies and passing through said bearing means of said second housing assemblies, said circular plate and said hub having a plurality of slots therein disposed angularly equidistant around said rotor;
   c. a plurality of second movable vanes disposed within said plurality of slots in said second rotor assembly, said second movable vanes each having a pivot point disposed adjacent one of said focal points of said second sealed sinusoidal enclosure, said second movable vanes each having one edge disposed close adjacent said sinusoidal surface of said second top housing assembly and a second edge disposed close adjacent said sinusoidal surface of said second bottom housing assembly, said second movable vanes defining a plurality of third spaces between said second rotor assembly and said second top housing assembly and an equal number of fourth spaces between said second rotor assembly and said second bottom housing assembly, said third spaces and said fourth spaces expanding and contracting sinusoidally as said second rotor assembly rotates;
   d. means for inserting a third expandable fluid into said third spaces;
   e. means for inserting a fourth expandable fluid into said fourth spaces;
   f. means for causing said third expandable fluid to expand in one of said third spaces; and
   g. means for causing said fourth expandable fluid to expand in one of said fourth spaces.

6. A rotary composite cycle engine as claimed in claim 5 wherein:
 a. said first expandable fluid in said first spaces and said second expandable fluid in said second spaces operate in the Otto cycle; and,
 b. said third expandable fluid in said third spaces and said fourth expandable fluid in said fourth spaces operate in the Stirling cycle.

7. A rotary composite cycle engine as claimed in claim 5 wherein:
 a. said first expandable fluid in said first spaces is a rich mixture operating in the Otto cycle;
 b. said second expandable fluid in said second spaces is a lean mixture operating in the Otto cycle; and,
 c. said third expandable fluid in said third spaces and said fourth expandable fluid in said fourth spaces operate in the Stirling cycle.

8. A rotary composite cycle engine as claimed in claim 5 wherein:
 a. said first expandable fluid in said first spaces and said second expandable fluid in said second spaces operate in the Otto cycle; and,
 b. said third expandable fluid in said third spaces and said fourth expandable fluid in said fourth spaces operate in the Stirling cycle.

9. A rotary composite cycle engine as claimed in claim 5 wherein:
 a. said first expandable fluid in said first spaces and said second expandable fluid in said second spaces is a rich mixture operating in the Otto cycle;
 b. said third expandable fluid in said third spaces and said fourth expandable fluid in said fourth spaces is a lean mixture operating in the Otto cycle;
 c. additionally, means are provided to allow said first spaces and said second spaces to transmit said rich mixture when burning to said lean mixture in said third spaces and said fourth spaces to ignite said lean mixture; and,
 d. said first spaces and said second spaces are smaller than said third spaces and said fourth spaces.

10. A rotary composite cycle engine as claimed in claim 5 wherein: said expandable fluids are all operating in a closed hot gas cycle.

11. A rotary composite cycle engine as claimed in claim 5 wherein: at least said first and said second expandable fluids are operating in a closed hot gas cycle.

12. A rotary composite cycle engine as claimed in claim 5 wherein: means are provided to allow said engine to operate with only the cycle of said first and second spaces in operation.

* * * * *

UNITED STATES PATENT AND TRADEMARK OFFICE
CERTIFICATE OF CORRECTION

PATENT NO. : 3961483
DATED : June 8, 1976
INVENTOR(S) : E. R. Wiley

Page 1 of 4

It is certified that error appears in the above-identified patent and that said Letters Patent are hereby corrected as shown below:

Claim 1, line 67, cancel beginning with "a. a first top housing assembly" to and including "g. means for causing said second expandable fluid to expand in one of said second spaces." in Column 7, line 53, and insert the following:

a) a first top housing portion and a first bottom housing portion, said first housing portions each being substantially annular about a central axis passing through said first housing portions, said first housing portions having means for supporting a first shaft means extending along said central axis, said first housing portions each having an inner surface contoured as a sinusoid of two periods at a pre-determined radial distance from said central axis and converging toward focal points at the outer periphery of said annulus, said first housing portions forming a first sinusoidal enclosure of substantially constant spacing between said first top housing portion and said first bottom housing portion at points radially equidistant from said central axis;

b) a first rotor assembly rotatably disposed within said first sinusoidal enclosure, said first rotor assembly comprising a substantially circular plate having a hub fixed thereto at the center of the plate, said hub having (a) first shaft means axially extending from the center of the hub and perpendicular to said plate, said first shaft means extending along said central axes of said first housing portions and passing through at least one of said shaft support means of said first housing portions, said circular plate and said hub having a plurality of slots therein disposed angularly equidistant around said first rotor assembly;

c) a plurality of first movable vanes disposed within said plurality of slots in said first rotor assembly, said first movable vanes each having a pivot point disposed adjacent one of said focal points of said first sinusoidal

UNITED STATES PATENT AND TRADEMARK OFFICE
CERTIFICATE OF CORRECTION

PATENT NO. : 3961483
DATED : June 8, 1976
INVENTOR(S) : E. R. Wiley

It is certified that error appears in the above—identified patent and that said Letters Patent are hereby corrected as shown below:

enclosure, said first movable vanes each having one edge disposed close adjacent said sinusoidal surface of said first top housing portion and a second edge disposed close adjacent said sinusoidal surface of said first bottom housing portion, said first movable vanes defining a plurality of first spaces between said first rotor assembly and said first top housing portion and an equal number of second spaces between said first rotor assembly and said first bottom housing portion, said first spaces and said second spaces expanding and contracting sinusoidally as said first rotor assembly rotates;

d) means for inserting a first expandable fluid into said first spaces;

e) means for inserting a second expandable fluid into said second spaces;

f) means for causing said first expandable fluid to expand in one of said first spaces; and, g) means for causing said second expandable fluid to expand in one of said second spaces.--

Claim 5, line 12, cancel beginning with "a. a second top housing assembly" to and including "g. means for causing said fourth expandable fluid to expand in one of said third spaces." in Column 8, line 68, and insert the following:

a) a second top housing portion and a second bottom housing portion, said second housing portions each being substantially annular about a central axis passing through said second housing portions, said second housing portions having means for supporting a second shaft means extending along said central axis, said second housing portions each having an inner surface contoured as a sinusoid of two periods at a predetermined radial distance from said central

UNITED STATES PATENT AND TRADEMARK OFFICE
CERTIFICATE OF CORRECTION

PATENT NO. : 3961483
DATED : June 8, 1976
INVENTOR(S) : E. R. Wiley

It is certified that error appears in the above-identified patent and that said Letters Patent are hereby corrected as shown below:

axis and converging toward focal points at the outer periphery of said annulus, said second housing portions forming a second sinusoidal enclosure of substantially constant spacing between said second top housing portion and said second bottom housing portion at points radially equidistant from said central axis;

b)  a second rotor assembly rotatably disposed within said second sinusoidal enclosure, said second rotor assembly comprising a substantially circular plate having a hub fixed thereto at the center of the plate, the last said hub having second shaft means axially extending from the center of the hub and perpendicular to the last said plate, said second shaft means extending along said central axes of said second housing portions and passing through at least one of said support means of said second housing portions, the last said circular plate and hub having a plurality of slots therein disposed angularly equidistant around said second rotor assembly;

c)  a plurality of second movable vanes disposed within said plurality of slots in said second rotor assembly, said second movable vanes each having a pivot point disposed adjacent one of said focal points of said second sinusoidal enclosure, said second movable vanes each having one edge disposed close adjacent said sinusoidal surface of said second top housing portion and a second edge disposed close adjacent said sinusoidal surface of said second bottom housing portion, said second movable vanes defining a plurality of third spaces between said second rotor assembly and said second top housing portion and an equal number of fourth spaces between said second rotor assembly and said second bottom housing portion, said third spaces and said fourth spaces expanding and contracting sinusoidally as said second rotor assembly rotates;

UNITED STATES PATENT AND TRADEMARK OFFICE
CERTIFICATE OF CORRECTION

PATENT NO. : 3961483
DATED : June 8, 1976
INVENTOR(S) : E. R. Wiley

It is certified that error appears in the above-identified patent and that said Letters Patent are hereby corrected as shown below:

d) means for inserting a third expandable fluid into said third spaces;

e) means for inserting a fourth expandable fluid into said fourth spaces;

f) means for causing said third expandable fluid to expand in one of said third spaces; and g) means for causing said fourth expandable fluid to expand in one of said fourth spaces; and, h) said first and second shaft means passing through said at least one support means of said first and second housing portions being drivingly connected to each other.--

Signed and Sealed this

Fifth Day of October 1976

[SEAL]

Attest:

RUTH C. MASON
*Attesting Officer*

C. MARSHALL DANN
*Commissioner of Patents and Trademarks*